UNITED STATES PATENT OFFICE.

GIDEON MYERS, OF BRIDGEWATER, NEW YORK.

IMPROVEMENT IN COMPOSITIONS FOR AQUEDUCT-PIPES.

Specification forming part of Letters Patent No. 3,514, dated March 28, 1844.

*To all whom it may concern:*

Be it known that I, GIDEON MYERS, of Bridgewater, in the county of Oneida and State of New York, have invented a new and Improved Aqueduct for containing and conveying water, gas, and other fluids under ground; and I do hereby declare that the following is a full and exact description of the same.

This composition is composed of the following materials and laid down in the following manner.

To enable others to make the composition and to build the aqueduct, I will proceed to describe the whole operation as particularly as possible.

In the first place, I have a portable mortar-box of sufficient size to make my composition in. I put into this box one-half bushel of clean yellow clay and two pailsful of salted water. Then with a hoe mix the clay and water together till it forms a solution. Then add to this solution two bushels of clean gravel. The particles of gravel should be of the bigness of walnuts, and from that down to the size of a pea. Mix the gravel well with the clay-water. Then add one bushel of good water-lime. Mix the whole well together, adding salt-water sufficient to make the mortar work free and easy. Some gravel will need more lime and clay than others; but the correct principle is to use no more clay and lime than it will take to fill the cavities or vacuums between the particles of gravel and cement them firmly together. In the next place, I will proceed to lay down or build the aqueduct. I dig my ditch two feet wide and of sufficient depth to get below the frost. This size ditch we will suppose is for an aqueduct of one-inch caliber, which I am about to lay down. In the center of this ditch cut a trench eight feet long, five inches wide, and four deep. Into this trench lay a cylinder of wood eight feet long and of the size of the trench. It should be rounded on the bottom and flat on the top. Then with a commander or beetle I pound it down hard from end to end. I then take the cylinder out, and it will of course leave a smooth impression in the ground and makes the trench straight on the bottom. In the next place I have a trough or box eight feet long, four inches wide on the bottom and five on the top, and four deep, which holds sufficient mortar to lay one length of aqueduct. I fill this trough with the composition already prepared and empty it into the trench cut in the bottom of the ditch. By means of this trough it keeps the aqueduct of a uniform size. I in the next place, have a wooden rod eight feet long and one inch in diameter, which is of the size of the caliber in the aqueduct about to be laid. At the end of this rod I have attached a short rod of two feet long by means of a small wire hinge, which brings the two pieces close together. I then bed this rod in the mortar in the trench within two inches of the bottom. Then with two trowels I close the mortar over the rod. I use a little new mortar that is wrought quite thin, so as to make the mortar unite and work sound around the rod. Care should be taken to keep the rod in the center of the pipe, so as to have the shell round the rod about two inches thick. I then cover the pipe with loose earth about six inches deep, turning the rod in the pipe now and then, so as not to have the mortar set fast to the rod, as it sets very quick. I then fill the ditch full of earth and stamp it down firmly. I now proceed to lay the next length by continuing the trench in the ditch eight feet farther from the pipe ready formed, lay in the cylinder as before, pound it down firmly, and take it out. I then draw the rod out of the pipe ready made until I come to the joint, which will, by means of the hinge, permit me to turn it up out of the way, leaving the short rod to remain in the pipe, so as to preserve the bigness of the caliber at the place where I join the pipe together. Then I fill my trough again with the composition, empty it into the trench, drop down the rod, and bed it in as before and close the mortar well over it. I am very careful to join the new pipe well with the old at the joints, and always make the pipe much heavier there, so as to be sure and have no leak. I then cover over the pipe with earth, as before, stamp it down, and then proceed with the next length in the same manner from length to length till I get the desired length of aqueduct, thus making the pipe all in one solid piece, if miles in length. This aqueduct can be made of almost any size, always regulating the thickness of the shell around the caliber according to the strength or pressure required. It can be used in about one week after putting down—that is, in a common pressure of water. After being in use six months it has every appearance of a stone, for the longer it is used the harder it grows, until it becomes a complete stone in every sense of the word, keeping the water as cool and as sweet as when dipped from the spring.

What I claim as my discovery, invention, and improvment, and desire to secure by Letters Patent, is—

The before-described composition of gravel, clay, water-lime, and salt for making aqueducts, cistern-pipes, tubes, and other articles; that I have not only invented and discovered the same, but brought the same into successful operation and use.

GIDEON MYERS.

Witnesses:
ALBERT BROCKWAY,
ELISHA BAKER.